March 1, 1966 M. ALTH 3,237,452

RATE OF CLIMB INDICATORS

Filed March 12, 1963

INVENTOR.

May Alth.

United States Patent Office 3,237,452
Patented Mar. 1, 1966

3,237,452
RATE OF CLIMB INDICATORS
Max Alth, 6 Tamarack Road, Port Chester, N.Y.
Filed Mar. 12, 1963, Ser. No. 264,554
1 Claim. (Cl. 73—179)

The present invention relates to the measurement of rate of an aircraft's climb and descent and the display of this information to the pilot.

The invention utilizes a mechanical to electrical transducer to convert the change in dimension of a standard aneroid cell in response to changes in altitude to a related voltage which is then displayed to the pilot by an electrical meter properly calibrated.

My invention provides many features not to be found in the present day rate of climb indicators which utilize so called "leaky diaphragms" and mechanical linkage to provide rate of climb information.

Specifically my invention provides a lighter weight, simpler, more accurate, more reliable, smaller, and less costly rate of climb indicator than heretofore known devices.

In addition my invention provides many important features not to be found at all in present rate of climb indicators.

Some of these features are a variable display scale control which permits the pilot to expand the scale presented at will, and an inflight test button. The variable scale feature permits the rate of climb indicated to be in feet, tens of feet or hundreds of feet as may be desired. The test button would permit an instant test of the rate of climb indicator that would provide accuracy and operational information.

Still another feature of my invention is the fact that the aneroid cell used to drive the transducer which provides rate of climb information may also be used simultaneously to drive a conventional altimeter mechanism. This, as can be realized, constitutes a great saving in space, parts, weight and cost.

The above and other advantages of my invention will become apparent from the description of my device which follows, and the drawings accompanying this application.

Figure 1:
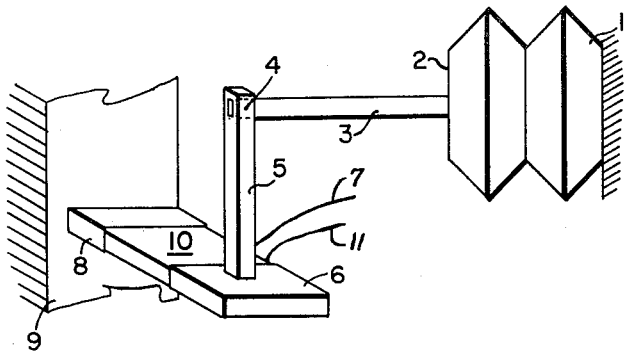
FIGURE 1 is a simplified perspective view of the basic elements of my device and illustrates one of the many forms it may take.

In FIGURE 1 a standard aneroid cell 1 is so mounted that one diaphragm of the cell is fixed and the other diaphragm 2 is mechanically coupled to mechanical link 3 coupled by means of pin 4 to bar 5 which in turn is firmly fastened to one end of a piezo electric crystal 6. The other end of the same crystal 8 is firmly affixed to a fixed member 9. Lead 7 and 11 carry the current generated by the crystal 10 to attenuator and associate circuits.

Figure 2:
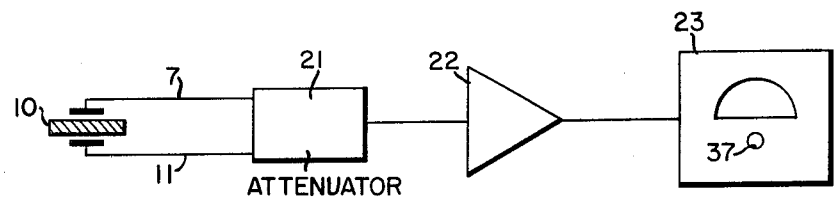
FIGURE 2 is a simplified schematic representation of the electrical circuit that may be used.

In FIGURE 2, crystal 10 is shown connected by means of leads 7 and 11 to attenuator 21 which is connected to amplifier 22 which is connected to readout meter 23.

Figure 3:
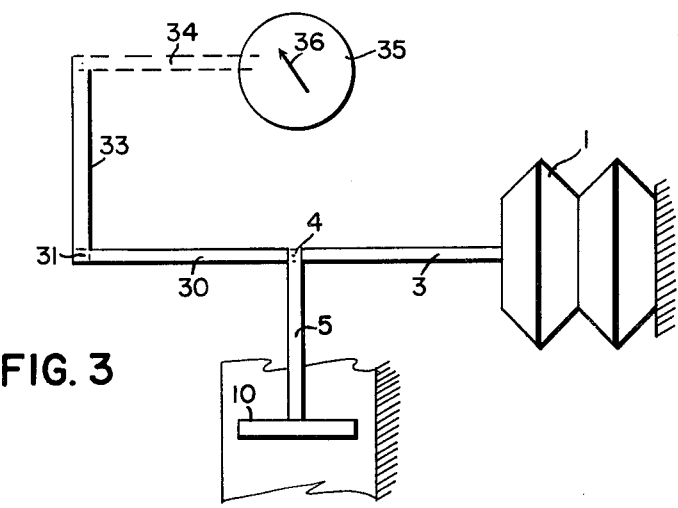
FIGURE 3 is a simplified representation of one standard aneroid cell driving both the transducer supplying rate of climb information and a conventional altimeter gear train terminating in an indicating pointer.

In FIGURE 3 aneroid cell 1 is shown connected by means of lever 3 and pin 4 to rod 5 and the piezo-electric crystal shown in FIGURE 1. In addition, however, pin 4 also serves to connect rod 30 to pin 31, rod 33 which activates a gear train 34, terminating in an indicator dial 35 and pointer 36.

Referring to FIGURE 1, assume that the entire device is mounted in an aircraft; as long as the aircraft maintains a level flight the aneriod cell will not vary its dimensions. For the sake of simplicity in this description I am excluding the precautions that will be taken to correct for temperature and barometric changes due to the weather. When the aircraft changes altitude the cell will vary its dimensions, and this change will be transferred to the crystal so as to distort one end of the crystal in relation to its other end by the linkage numbered in FIGURES 1, 3, 4, 5 and 6. End 8, firmly affixed to non-moving member 9, prevent the further end of the crystal from yielding to the distorting strain. The piezo-electric crystal will produce a voltage that is proportional to the extent and speed of its deformation. The voltage so produced will be attenuated, amplified and displayed by an electrical meter. When the aircraft returns to level flight the dimensions of the aneroid cell no longer change and the crystal—though it may be still deformed—no longer being further deformed, nor relieved of stress—produces no voltage. The rate of climb readout meter returns to zero indication.

The piezo-electric crystal is uniquely suited to this purpose. Sealed crystals are available which will produce several volts in response to grams of pressure over a distance of a fraction of an inch.

Several possible refinements need to be mentioned here. Bimetallic elements may be used in the linkage to correct for temperature changes. The fixed end of the crystal may be furnished with an adjustment so that its position in respect to its moving end may be changed to correct for normal barometric pressure changes not due to altitude changes.

Referring to FIGURE 2, the attenuator 21 would contain the variable element which could be controlled by the pilot to vary the rate of climb indicated by the readout meter. Because the rate of climb information produced by the piezo-electric crystal is in the form of a voltage it is a simple matter to accurately attenuate the voltage produced in discrete steps by a step attenuator. At highest amplification, minimum attenuation, the readout meter might be calibrated to indicate rate of climb in feet. As attenuation was decreased in steps of ten, rate of climb might be indicated in tens of feet, hundreds of feet, and thousands of feet.

The amplifier 22 provides the gain and power necessary to drive the readout meter. The amplifier could be provided with a fixed reference voltage. By means of suitable circuitry and a control button on the face of the readout meter one could disconnect the crystal and supply the attenuator and associate circuitry with a test voltage. Under these conditions the readout meter would both indicate the satisfactory operation (or not satisfactory) of the circuit, and also indicate the accuracy or lack of accuracy of the instrument from the crystal through the readout meter.

The amplifier would also contain suitable electronic parts such as reference zeners to prevent the readout meter from going off scale should the aircraft change its altitude rapidly when the meter was indicating rate of climb in feet or tens of feet.

More sophisticated circuitry could also be incorporated to make the meter automatically switch from scale to scale as its rate of climb changed from feet per minute to several thousand feet per minute and back again.

Referring to FIGURE 3, a single standard aneroid cell is used to drive both a piezo-electric crystal which provides rate of climb information, and a conventional altimeter mechanism. As can be seen the aneroid cell 1 is coupled by maens of 3, 4, 5 and 6 to crystal 10, and also coupled to the same cell by means of pin 5, linkage 30, 32, 33, 34 is a conventional altimeter gear train terminating in pointer 36. As can be seen, by proper design of the various interrelated linkage and fixed members it is possible to relate the dimensional changes of cell 1 in response to air pressure changes due to altitude changes to rate of climb and altitude readout. Translational motion of diaphragm 2 is transmitted by the illustrated linkage to distort crystal 10, and to drive gear train 34. Crystal stress results in a voltage which is read out as a rate of climb indication, linear motion applied to gear train 34 results in positions the altitude pointer in relation to the altitude dial face.

In actual practice it will be possible to utilize solid state circuitry for the amplifier and to mount the crystal, amplifier and related circuitry inside the case of the altimeter. The scale expansion control can be mounted as an integral part of the altimeter, and possibly the rate of climb readout meter can also be given a portion of the altimeter display face. If desired the rate of climb readout meter and its scale control can be fabricated as a separate unit.

It can be seen that I have provided an improved rate of climb instrument which utilizes the unique properties of electrical transducers to provide direct electrical readout of rate of climb, and which also provides many unique and valuable features.

In the foregoing my invention has been described in conjunction with preferred illustrative embodiments. Because of the many variations and modifications that will now become obvious to those skilled in the art, I prefer not to be limited to the specific disclosures contained herein but only by the appended claim.

The embodiments of my invention in which an exclusive privilege or property is claimed and for which I pray that Letters Patent be granted me are as follows:

A device for measuring rate of climb comprising a piezo-electric crystal, a bellows, one end of said bellows exposed to the atmosphere, the other end of said bellows mechanically coupled to one end of said piezo electric crystal means such that the force caused by a change in atmospheric pressure at the bellows is directly transmitted to said crystal, said crystal producing an electrical signal in proportion to each change in force exerted thereon, said crystal output connected to the input of an attenuation means, the output of said attenuation means connected to the input of an amplifier, said amplifier including reference voltage means, a readout meter calibrated in terms of rate of climb, said meter including a manually operative control button operable to connect said reference voltage into measuring circuit so as to test the operation of said measuring circuit, said amplifier further including reference means to prevent said readout meter from going off scale upon sudden changes in altitude.

References Cited by the Examiner

UNITED STATES PATENTS

| | | | |
|---|---|---|---|
| 2,119,364 | 5/1938 | Smith | 324—126 |
| 2,398,470 | 4/1946 | Shivers | 73—386 |
| 2,748,355 | 5/1956 | Jarvis | 73—386 |
| 2,819,615 | 1/1958 | Colt | 73—179 |
| 3,086,132 | 4/1963 | Ostrow | 73—141 |
| 3,143,883 | 8/1964 | Nakasone | 73—514 |

OTHER REFERENCES

Survey of Energy, Conversion Systems, Transducers for Control by Donald Leikowitz, Product Engineering, July 23, 1962.

LOUIS R. PRINCE, *Primary Examiner.*

ISAAC LISANN, DAVID SCHONBERG, *Examiners.*

C. CARTER ELLS, DONN McGIEHAN, *Assistant Examiners.*